June 1, 1948.  J. A. LENO ET AL  2,442,366
JOINT FOR ELECTRIC POWER CABLES
Original Filed Feb. 23, 1940
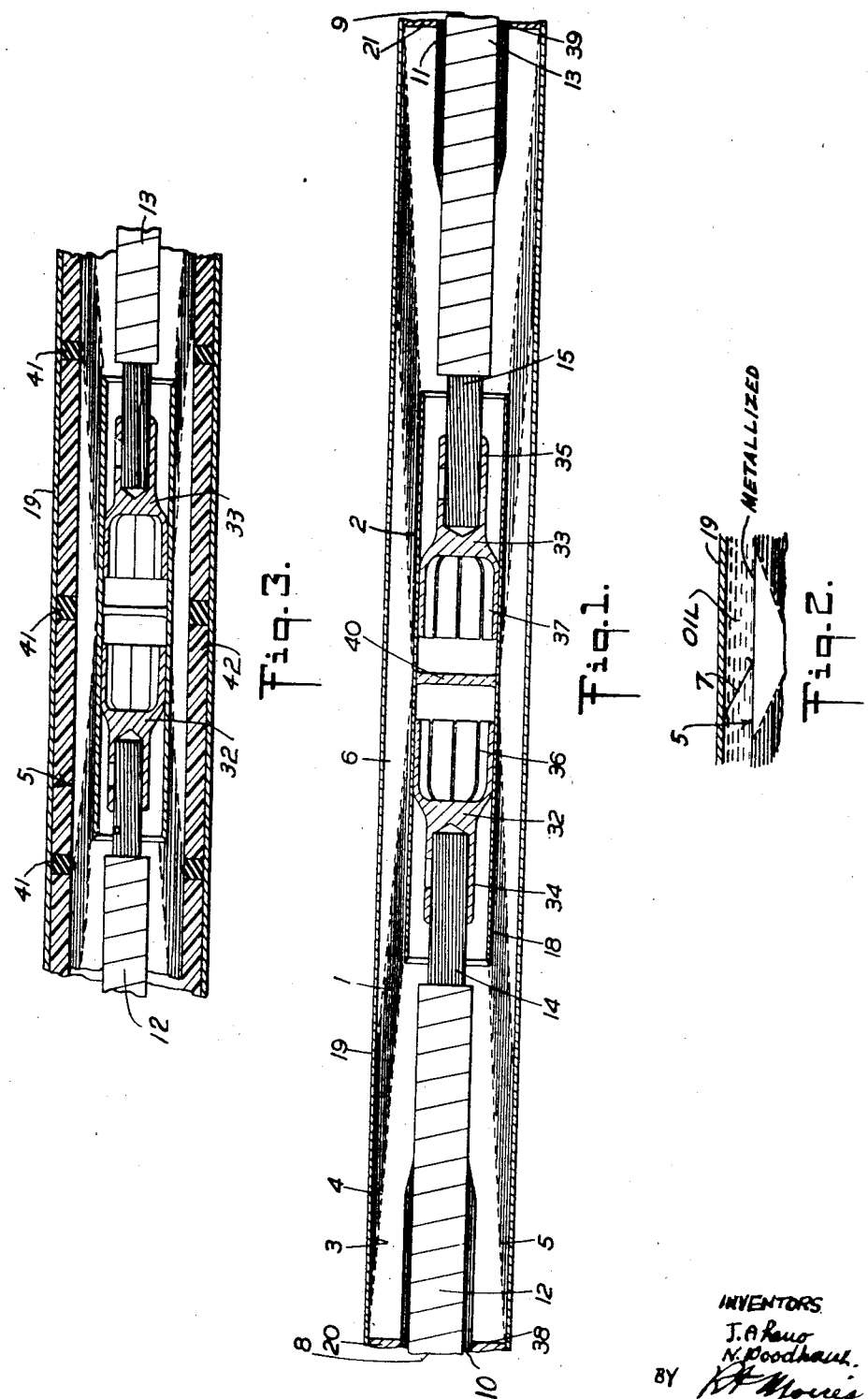

Patented June 1, 1948

2,442,366

UNITED STATES PATENT OFFICE 2,442,366

JOINT FOR ELECTRIC POWER CABLES

John Albert Leno and Noel Woodhouse, London W. C. 2, England, assignors to International Standard Electric Corporation, New York, N. Y.

Original application February 23, 1940, Serial No. 320,378. Divided and this application May 16, 1942, Serial No. 443,291. In Great Britain March 24, 1939

4 Claims. (Cl. 174—73)

This invention relates to a joint for electric power cables and is divided from application Serial No. 320,378, filed February 23, 1940, now abandoned.

It is an object of the present invention to provide a joint for electric power cables that can be rapidly assembled.

The invention will be understood from the following description taken in conjunction with the accompanying drawing in which Fig. 1 shows a joint constructed according to the invention, and Figs. 2 and 3 illustrate respective modifications of the joint shown in Fig. 1.

Fig. 1 shows a joint made between two power cables 8, 9. The cables 8, 9 comprise respectively lead sheaths 10, 11, insulation 12, 13 and conductors 14, 15. In the preparation of the joint there is used a structure 5 which may be completely formed and tested in the factory, thereby reducing the jointing time required in the field. This structure 5 comprises two condenser cones 1, 2 and may be formed by winding conductive layers 3 and insulating layers 4 on a common former 18 in such a way that the two cones 3 and 4 are held together by inter-leaving layers of insulation forming an annulus 6 of insulation between the cones 1 and 2. The two cones 1, 2 and the additional insulation 6 are wound in one operation, for example, from a single roll of paper or other insulant, prior to application to the cable. The insulation is, therefore, preformed and may comprise a single compact cylinder formed upon a metal tube, the insulation 4 being provided with metallic conducting layers 3 to give the condenser cone effect.

The insulation 4, 6, may comprise paper impregnated with oil, paper impregnated with polymerized material (e. g. paper impregnated with polystyrene, hereinafter referred to as styrenated paper), or other suitable insulating material. If styrenated paper be used the styrenation may be effected by impregnating the condenser roll 5 comprising the two condenser cones 1, 2 with monomeric styrene and subsequently effecting polymerisation. Alternatively, pre-styrenated paper may be employed and adjacent layers welded together after winding by heating. This or a similar method may be employed if a sheet or film of styrene, styrene rubber, or a blend of styrene with other polymers such as polyisobutylene, is used for winding the roll. It may here be emphasised that should it be desired to construct a barrier or stop joint then polymerised material should be employed.

The preformed roll 5 is slid over the end of one cable length, the conductors 14, 15 are jointed by a ferrule, and the roll is then slid along until it is centrally over the ferrule.

The ferrule 32, 33 comprises a tubular part 34, 35 arranged to fit over the associated conductor 14, 15 and a plug part 36, 37 adapted to be inserted into the tubular former 18 of the structure 5, which is of good conducting metal: The plug part 36, 37 of each ferrule 32, 33 is of spring formation as shown so that when the plug parts of the two ferrules have been inserted into the tubular former 18 the electrical continuity of the cable is maintained through the former 18.

A metal joint sleeve 19 is then applied overall and plumbed to the lead sheaths 10, 11 of the cable lengths as shown at 20, 21. The interior of the sleeve 19 may then be evacuated and filled with an insulating compound (preferably plastic and non-migratory, e. g. polystyrene or the like) in any suitable manner. The inner diameter of the sleeve 19 may be substantially equal to the outer diameter of the roll 5 and may be bonded thereto by means of styrene or the like. On the other hand when migratory compound is used, the sleeve 19 may be of greater internal diameter than that of the external diameter of the roll 5, which may also be eccentrically disposed within the sleeve 19 in such a manner that there is an excess of filling compound at the upper side of the joint, the outer surface of the roll 5 in such a case being preferably metallised and maintained at sleeve potential by means of a conductive spring contacting with the exterior of the roll and the interior of the sleeve 19.

The arrangement just described is illustrated in Fig. 2 where the sleeve 19 has an inner diameter greater than the outer diameter of the roll 5, the resulting intervening space being filled with migratory compound such as oil. A spring 7 extends between the inner surface of the sleeve 19 and the outer, metallized surface of the roll 5 to provide conductive contact between the two surfaces.

In cases in which the sleeve 19 is of greater diameter internally than that of the roll 5 and barrier action is required, the space between the sleeve 19 and the roll 5 may be divided into two or more compartments by one or more radial discs (e. g. of metal or insulating material) which may be bonded to the sleeve 19 (e. g. by polystyrene) and the compartments may be filled with insulating material (e. g. polystyrene) or if the outer surface of the roll 5 is metallised may be filled with metal. An insulating roll 38, 39 may be provided to build up the insulation within each end of the condenser cone 5 in order to take care of the radial voltage stress concentrated at the termination of the sheath.

Fig. 3 illustrates the case in which a plurality of insulating discs 41 extend radially between the sleeve 19 and the roll 5; the annular spaces 42 formed between the discs are filled with insulating material which may be polystyrene. If the other surface of the roll 5 were metallized as in Fig. 2, the spaces 42 could be filled with metal and the discs 41 could likewise be of metal.

The joint may be prepared by securing the ferrules 32, 33 in position on the conductors 14, 15 after which the plug part of one of the ferrules, e. g. the plug part 36 of the left-hand ferrule 32 in the drawing may be inserted into the tubular former 18 and pushed in until the end of the plug part 36 abuts against a partition 40 positioned within the tubular former 18. Then the right-hand ferrule 33 is inserted into the tubular former 18 by suitable manipulation of the cable length 9 and the tubular former 18 may be then moved slightly towards the right in the drawing in order to take up expansion and so on. It will, therefore, be appreciated from the above that the joint may be very expeditiously prepared in the manner described, the springy nature of the plug parts 36, 37 ensuring satisfactory contact between the plug parts 36, 37 and the former 18, so that the electrical continuity of the joint is maintained. It will, of course, be understood that the former 18 should be sufficiently thick to pass the current carried by the cable 8, 9.

It may be mentioned that while the invention has been described with special reference to a single core cable, a similar method may, with advantage, be applied to a multi-core cable.

What is claimed is:

1. Connecting means for joining the abutting ends of wire cables, comprising a hollow conductive tube spaced about and from said abutting ends, and a conductive ferrule attached to each of said ends, each ferrule comprising a first generally hollow cylindrical portion of a smaller diameter than said tube, closed at its inner end and surrounding and adapted to tightly fit about the respective cable end, and a second cylindrical portion having an outer diameter substantially equal to the inner diameter of said tube, said second cylindrical portion being hollow and forming a projecting termination for each cable end, and consisting of a plurality of circumferentially spaced resilient fingers pressing against the inner wall of said conductive tube and integrally attached at one end to the closed end of said first portion.

2. The combination according to claim 1, in which said conductive tube is formed with a tightly fitting transverse partition intermediate its ends, forming a stop for said ferrules and preventing the passage of a fluid through said joint.

3. Power cable joint comprising a tubular metal form, condenser cones, one wound about each opposite end of said form and extending longitudinally beyond each end, and cable connector means slidably mounted in said metal form, said means consisting of a pair of metal ferrules, each ferrule comprising a first generally hollow cylindrical portion of a smaller diameter than said tubular form, closed at its inner end and surrounding and adapted to tightly fit about the respective cable end, and a second cylindrical portion having an outer diameter substantially equal to the inner diameter of said tubular form, said second cylindrical portion being hollow and projecting beyond the cable end, and consisting of a plurality of circumferentially spaced resilient metallic tongue members pressing against the inner wall of said tubular form and integrally attached at one end to the closed end of said first portion.

4. Power cable joint for joining the ends of a stranded conductor, said joint comprising an outer metallic sleeve and an inner tubular metallic former, a condenser roll comprising two condenser cones of which one is wound about each opposite end of said former and extends substantially longitudinally beyond each end of said former, two metal connectors housed within said former for joining said stranded conductors and comprising a pair of metal ferrules, each ferrule comprising a first cylindrical portion surrounding and adapted to tightly fit about the respective conductor ends, and a second cylindrical portion having an outer diameter substantially equal to the inner diameter of said former, said second cylindrical portion being hollow and projecting beyond the stranded conductor ends to be joined, said metallic sleeve being filled with a migratory compound, and the outer surface of the condenser roll being metallized and connected by means of an electrically conductive spring to the interior of the cable joint sleeve.

JOHN ALBERT LENO.
NOEL WOODHOUSE.

REFERENCES CITED

The following references are of record in the file of this patent:

UNITED STATES PATENTS

| Number | Name | Date |
|---|---|---|
| 690,113 | Leggatt | Dec. 31, 1901 |
| 1,153,580 | Sheppy | Sept. 14, 1915 |
| 1,167,962 | Wilson | Jan. 11, 1916 |
| 1,175,343 | Conrad | Mar. 14, 1916 |
| 1,975,885 | Wellman | Oct. 9, 1934 |
| 2,255,553 | Funk | Sept. 9, 1941 |

FOREIGN PATENTS

| Number | Country | Date |
|---|---|---|
| 19,654/34 | Australia | Oct. 8, 1935 |
| 129,697 | Switzerland | Jan. 2, 1929 |
| 339,654 | Great Britain | Dec. 12, 1930 |
| 428,006 | France | June 12, 1911 |
| 464,801 | Great Britain | Apr. 26, 1937 |